(12) United States Patent
Degner et al.

(10) Patent No.: US 10,054,700 B2
(45) Date of Patent: Aug. 21, 2018

(54) GEOPHYSICAL SENSOR MOUNTING WITH IMPROVED GROUND COUPLING

(71) Applicant: GEOPHYSICAL TECHNOLOGY, INC., Bellaire, TX (US)

(72) Inventors: Richard A. Degner, Bellaire, TX (US); Gary L. Scott, Missouri City, TX (US)

(73) Assignee: GEOPHYSICAL TECHNOLOGY, INC., Bellaire, TX (US)

( * ) Notice: Subject to any disclaimer, the term of this patent is extended or adjusted under 35 U.S.C. 154(b) by 34 days.

(21) Appl. No.: 15/124,714

(22) PCT Filed: Mar. 9, 2015

(86) PCT No.: PCT/US2015/019452
§ 371 (c)(1),
(2) Date: Sep. 9, 2016

(87) PCT Pub. No.: WO2015/138325
PCT Pub. Date: Sep. 17, 2015

(65) Prior Publication Data
US 2017/0212259 A1    Jul. 27, 2017

Related U.S. Application Data

(60) Provisional application No. 61/950,232, filed on Mar. 10, 2014.

(51) Int. Cl.
*G01V 1/16* (2006.01)
*G01V 1/24* (2006.01)

(52) U.S. Cl.
CPC ............... *G01V 1/24* (2013.01); *G01V 1/166* (2013.01); *G01V 1/168* (2013.01); *Y10S 181/401* (2013.01)

(58) Field of Classification Search
CPC ............................. G01V 1/166; Y10S 181/401
USPC ........................................................ 367/188
See application file for complete search history.

(56) References Cited

U.S. PATENT DOCUMENTS

| | | | |
|---|---|---|---|
| 1,951,358 A * | 3/1934 | Hayes | G01V 1/181 367/185 |
| 3,930,218 A | 12/1975 | Hall, Jr. | |
| 4,122,433 A | 10/1978 | McNeel | |
| 6,307,808 B1 | 10/2001 | Schmidt | |
| 6,814,160 B1 * | 11/2004 | Scott | G01V 1/16 175/19 |
| 7,730,786 B2 * | 6/2010 | Pichot | G01V 1/16 73/584 |

(Continued)

FOREIGN PATENT DOCUMENTS

| | | |
|---|---|---|
| GB | 2496106 A | 5/2013 |
| WO | 9219991 A1 | 11/1992 |

OTHER PUBLICATIONS

European Patent Office, Extended European Search Report for European Application No. 15762141.8, dated Nov. 7, 2011.

*Primary Examiner* — Ian J Lobo
(74) *Attorney, Agent, or Firm* — Richard A. Fagin

(57) ABSTRACT

A nodal geophysical sensing system includes a ground contact sleeve defining an interior space and having at least one feature on an exterior thereof for contacting and compressing ground materials adjacent the exterior. A nodal geophysical sensor having a housing engages at least one feature on the interior space so as to enable acoustic energy transmission between the ground contact sleeve and the housing.

20 Claims, 9 Drawing Sheets

(56) References Cited

U.S. PATENT DOCUMENTS

| | | | |
|---|---|---|---|
| 9,234,973 B2 * | 1/2016 | Scarlatti | ............ G01V 1/16 |
| 9,494,449 B2 | 11/2016 | Pichot | |
| 2004/0257913 A1 | 12/2004 | Ray | |
| 2008/0137484 A1 | 6/2008 | Scott | |
| 2009/0178809 A1 | 7/2009 | Jeffryes et al. | |

* cited by examiner

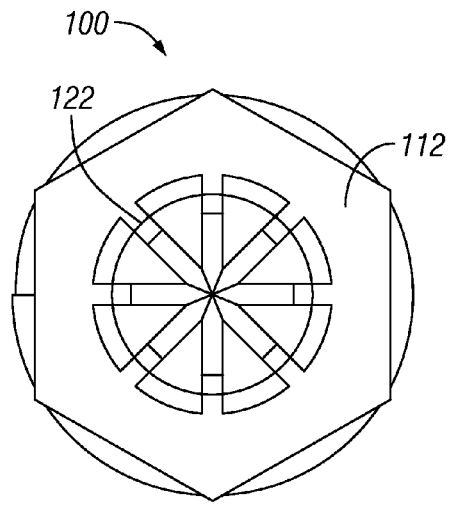
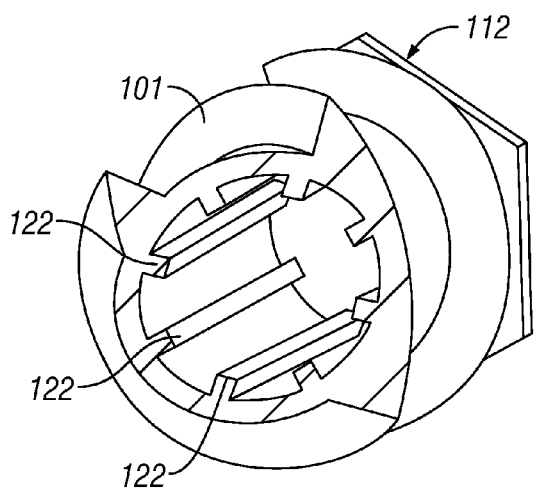
FIG. 11  FIG. 12
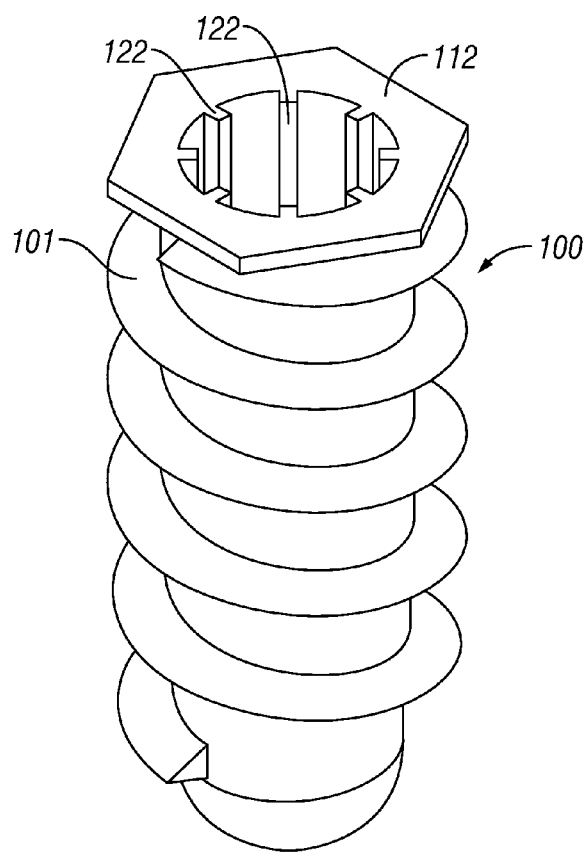
FIG. 13

GEOPHYSICAL SENSOR MOUNTING WITH IMPROVED GROUND COUPLING

BACKGROUND

This disclosure is related to the field of geophysical measuring instruments. More specifically, the disclosure relates to geophysical measuring instruments requiring good acoustic coupling to the ground, such as seismic sensors.

Seismic sensors require good acoustic coupling to the ground, which may be characterized by a sensing element that detects ground motion with insignificant loss of signal or change in the characteristics of the vibration as it is transferred from the ground to the sensing element. When a sensing element (e.g., a geophone or other particle motion responsive sensor) is disposed in loose surface soils, for example, the detected signal quality may be diminished relative to that which would be detected if the sensing element were disposed in compact soil due to particle distribution of energy resulting from increased degrees of freedom. Additionally, the rapid expansion of computing power affords the opportunity to record seismic activity with greater precision. Therefore, the ability to record changes in seismic signal content ("seismic signatures") over time intervals of months or years has become feasible. However, the requirement to service seismic sensors from time to time has made it difficult to reinstall a seismic sensor into the exact location of the original recording and/or in the identical orientation. The latter limitation may make time lapse recording of directionally sensitive seismic energy, e.g., shear energy difficult.

Referring to FIGS. 1 and 2, International Patent Application Publication No. WO 92/19991 describes an autonomous seismic sensing and data recording system 1 disposed in an auger shaped housing 2. The shape of the housing 2 is intended to improve acoustic coupling between the ground and the housing 2 by having external threads 21 in FIG. 2 such that the ground is spread apart as the housing 2 is rotated and moved axially into the ground by the action of the threads 21. A tool receptacle 5 (FIG. 1) disposed on an upper cover 3 of the housing 2 maybe provided to enable threading and unthreading of the housing 2 for installation and removal of the sensor system 1. The foregoing system 1 is illustrated in cross section in FIG. 1, showing internal sensing (orthogonally mounted geophones 7, 8 and 9 and magnetometers 10A, 10B) and signal processing/recording devices 11, 12, 14, 14, 15, 16, 17. FIG. 2 shows the housing 2 with auger type threads 21 in oblique view. The threads have a selected pitch P, thread height H and maximum external diameter Ds. In this example the housing 2 and sensor components (see FIG. 1) are an inseparable unit. Therefore, removal of the sensor from the ground requires retrieval of the housing 2, thus making it necessary to attempt to locate the original sensor position in certain types of surveys requiring precise subsequent location of sensors in their former positions. While the ability to mark a sensor location with markers such as flags is possible, such markers are prone to displacement or loss.

One aspect of accurate time lapse or 4D imaging separated by months or years has been the practice of removing the sensor device for subsequent use in different locations until it is time to record data with the sensors in their original positions. In some instances, one or more components of the sensor system may require servicing, e.g., recharging batteries, or the sensor system may be required to be removed from the ground in order to interrogate an internal data storage device. It is thus necessary to remove the sensor system housing from the ground. In some cases such removal may be undesirable because over time, acoustic coupling between such a sensor housing and the ground may actually improve. Also to provide a consistent image, it is essential that the sensor occupy the exact same location on the earth for every imaging process. It is desirable, therefore, to have a sensor mount that provides equivalent acoustic coupling to the ground as that disclosed in the WO '991 publication while enabling removal and replacement of the active components of the sensor system and leaving an acoustic coupling mechanism in place at the selected ground location.

SUMMARY

According to some aspects of the present disclosure, a novel gripping collar has been developed that simultaneously creates a secure coupling to the earth, regardless of soil type, while also providing a housing for a sensor unit. Reproducible coupling of a sensor to the ground may be improved with the disclosed coupling device. More importantly, the gripping collar allows for retrieval of the sensor unit, while leaving the gripping collar in the ground. In some example embodiments, the gripping collar may be capped to prevent the accumulation of sediment and debris when a sensor is not disposed in the gripping collar.

BRIEF DESCRIPTION OF THE DRAWINGS

FIG. 11 shows a top view of the example embodiment shown in FIG. 10.

FIG. 12 shows an oblique cut away view of the embodiment shown in FIG. 10.

FIG. 13 shows an oblique view of the embodiment shown in FIG. 10.

DETAILED DESCRIPTION

An example geophysical sensor with improved ground contact coupling according to the present disclosure may be designed such that ground contact sleeves may be installed into the earth (e.g., on the land surface or water bottom) through a number of methods, each being particularly suitable for different ground conditions. Some of the ground contact sleeves defined here are not the only possibilities and this description does not limit the disclosure to any particular type or number of designs. In general, a ground contact sleeve according to the present disclosure may have at least one feature on its exterior surface that increases the exterior surface area of the ground contact sleeve beyond that of a substantially smooth, round surface.

Figures 1, 2:
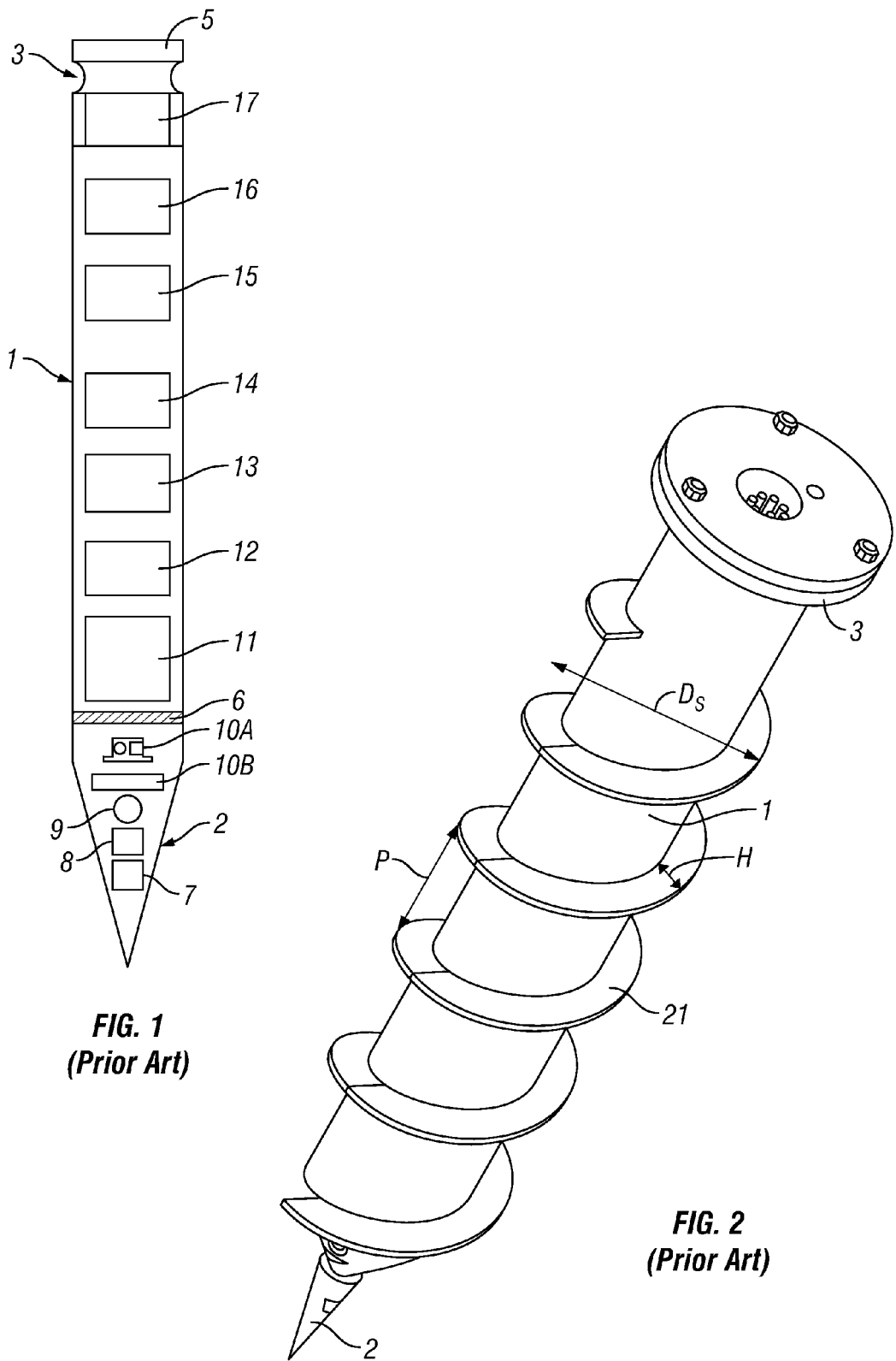
FIGS. 1 and 2 show a cross sectional view and an oblique view, respectively, of an autonomous seismic data acquisition device known in the art.
Figure 3:
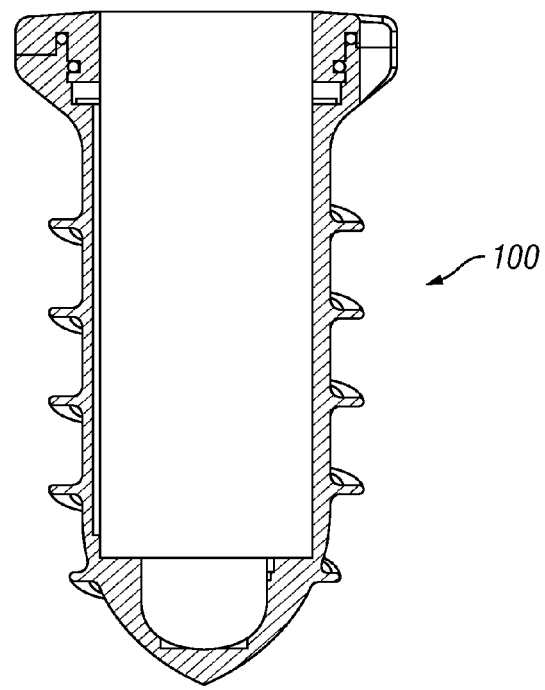
FIG. 3 shows an example ground contact housing (sleeve) according to the present disclosure.

Referring to FIG. 3, which shows an example ground contact sleeve 100, the ground contact sleeve 100 may be configured to be able to be "punched" or pressed into the earth, i.e., the surface soil, by use of a hydraulically driven, pointed punch device, where a ground contact sleeve 100 is placed onto the punch end so when the ground contact sleeve 100 is driven into the earth and the punch device is retracted, the ground contact sleeve 100 remains in the ground. The ground contact sleeve 100 may have features on its exterior surface, explained further below, to provide efficient acoustic coupling to the earth regardless of the type soil at the location where the ground contact sleeve 100 is deployed, e.g., sand, peat, marsh, snow, ice, topsoil or clay. FIG. 3 illustrates several concepts of a ground contact sleeve according to the present disclosure: a cavity to hold a sensor unit, and external edges to enhance mechanical grip of the ground contact sleeve 100 by the surrounding media. In some embodiments a pilot hole may be punched, pressed or drilled in the surface soil. Example embodiments of the ground contact sleeve 100 may have features such as edges, blades, ridges, threads or flights of selected geometry, such that the mechanical coupling between the ground contact sleeve 100 and the ground may be improved. In an example embodiment, the features may comprise ridges having alternating geometric shapes that increase the surface area of the portion of the ground contact sleeve 100 in contact with the soil. Such increased surface area may improve the mechanical strength provided by insertion of the ground contact sleeve 100 into a pilot hole having an initial internal diameter less than the external diameter of the ground contact sleeve 100. A possible range of pilot hole diameters that may provide improved acoustic coupling may be about 2 inches to 2.75 inches, with a more preferred range of about 2.4 inches to 2.6 inches.

Figure 4:
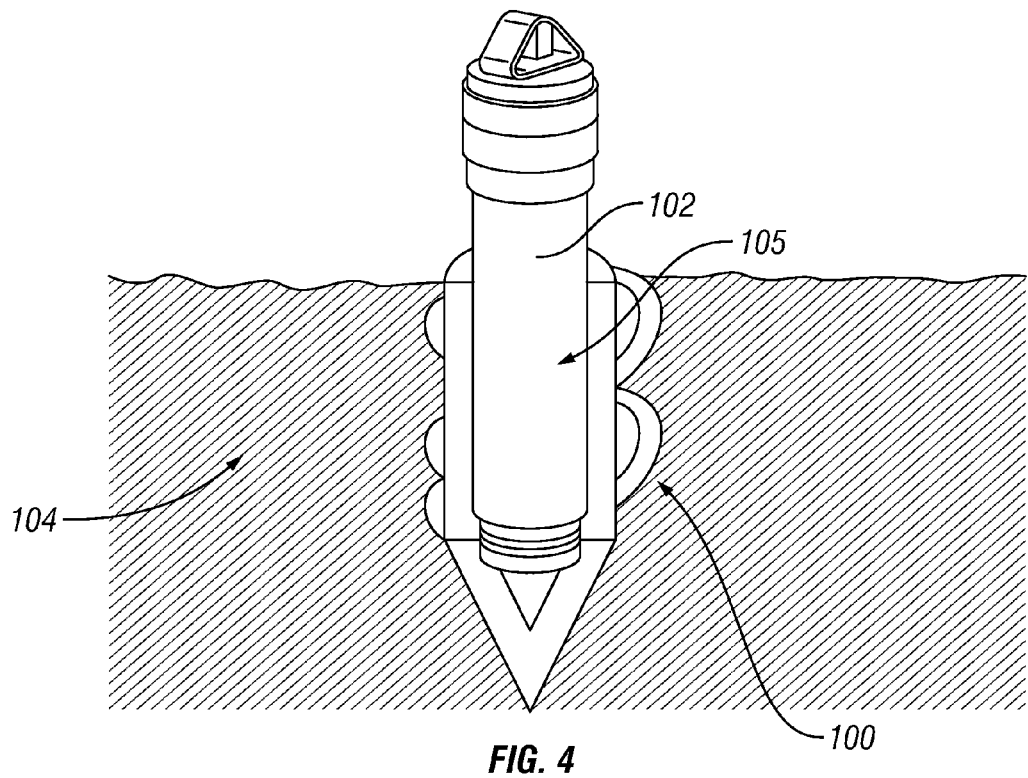
FIG. 4 shows an example of a nodal acquisition unit disposed in a ground contact sleeve according to FIG. 3.

A hole punching (or pressing) and ground contact sleeve installing device may insert the ground contact sleeve 100 into a pre-formed hole, and then move to a pre-formed hole disposed at a next predetermined sensor location. After installation of the ground contact sleeve 100, a nodal sensor unit may be installed into the ground contact sleeve 100 at any time after the ground contact sleeve 100 is deployed. The ground contact sleeve 100 may be made from any suitable solid, substantially rigid material that is an efficient conductor of acoustic energy. Preferably a density difference between the surface soil materials and the material from which the ground contact sleeve 100 is made may be minimized to reduce acoustic impedance contrast between the ground contact sleeve 100 and the surrounding ground materials (FIG. 4). The material selected for the ground contact sleeve 100 should also be strong enough to withstand multiple insertions and retrievals of the seismic sensor (e.g., a nodal sensor unit).

FIG. 4 shows a nodal sensor unit 102 (sensor node) installed in an implanted ground contact sleeve 100 pre-inserted into the ground 104. The nodal sensor unit 102 may be physically coupled to the ground contact sleeve 100, e.g., by corresponding external and internal features to be explained in more detail below, wherein a sensor housing 105 forms part of the sensor node 102. The sensor housing 105 may be acoustically coupled to one or more seismic sensors (not shown) inside the sensor node 102. The sensor housing 105 is urged into physical contact with internal surface features (explained below) in the interior of the ground contact sleeve 100 to improve acoustic coupling between the sensor housing 105 and the ground contact sleeve 100. The sensor housing 105 may be a conventional seismic sensor ground mounting spike, or may be a specially shaped, e.g., tapered, rod or a cylinder configured to fit tightly within the interior space in the ground contact sleeve 100. In some embodiments, the nodal sensor unit 102 may then be locked into the ground contact sleeve 100 using a specialized locking device to prevent unwanted removal by unauthorized persons. In one example embodiment, the locking device may be a screw type hose clamp operable by a specialized driver tool (not shown).

FIG. 4 illustrates the principle of a ground contact sleeve 100 according to the present disclosure: a ground contact sleeve with relatively large surface area for mechanical strength in surrounding soil; a sensor unit that couples to the ground contact sleeve wherein an optimum geometric arrangement of contact points between the ground contact sleeve and the sensor may be provided to maximize acoustic signal transmission. At least one feature on the exterior of the ground contact sleeve 100, for example, auger flights compresses the ground materials both along an axis of the ground contact sleeve and perpendicularly thereto to improve acoustic coupling.

In some embodiments to be described further below a locking mechanism may be provided to secure the sensor to the ground contact sleeve so that sensor can be removed only by using a tool configured to release the locking mechanism.

Figure 9:
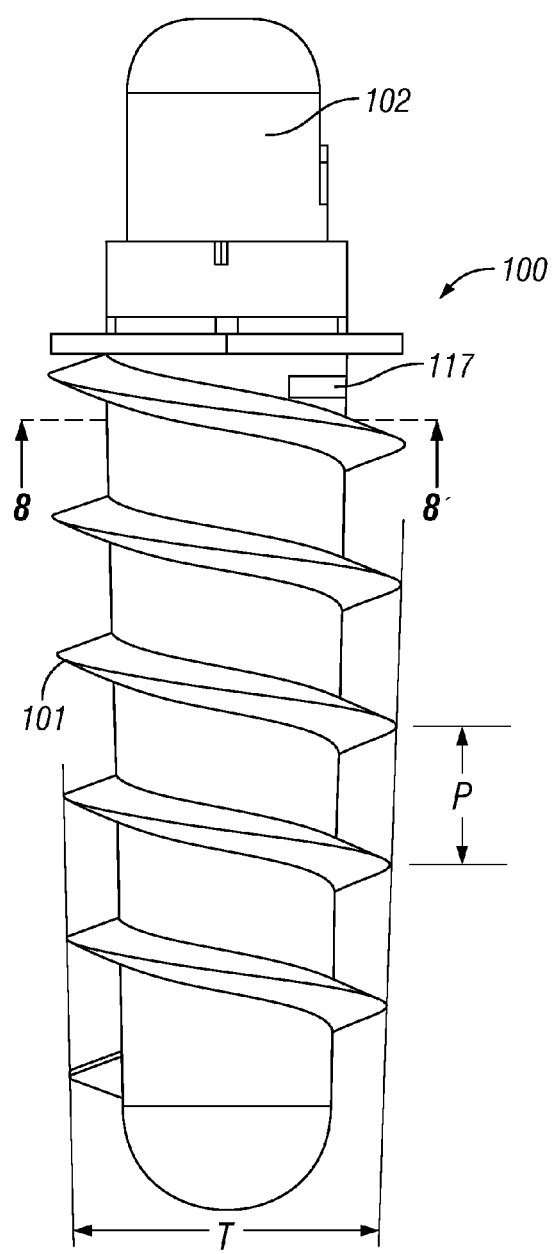

Different example ground contact sleeve designs may have different shapes, such as with external screw, or auger, flights (threads) and will obtain continuous and high quality acoustic coupling with the earth by way of the screwing action to insert the auger flights into the earth (see FIG. 9). Screwing insertion of the ground contact sleeve 100 may be performed with hand held drill motors, or hand-operated drive handles with a corresponding tool end shape to mate with a shape in an interior of the ground contact sleeve 100 or a tool surface on an exterior of the ground contact sleeve 100. Non-limiting examples may include corresponding geometrically shaped surface of the exterior of such tool and the interior or exterior surfaces of the ground contact sleeve 100.

In one example embodiment, a geometric pattern of ridges on an exterior surface of the ground contact sleeve may include such features as diamonds, ovals, squares and/or other geometric shapes that increase the surface area of contact between the ground contact sleeve and the surface soil from 100 mm$^2$ to 1000 mm$^2$, with a preferred range of 500 to 750 mm$^2$. The configuration of external features and ground contact surface area for any example ground contact sleeve may be optimized for a particular soil type. For example for sandy soil, squares that increase the surface area by 750 mm$^2$ may provide optimal contact between the ground contact sleeve and the surface soil.

In another example embodiment, the exterior of the ground contact sleeve may comprise a feature on an upper end thereof capable of affixing a cap to deter contamination of the interior of the ground contact sleeve with sediment and debris.

In another example embodiment, the interior surface of the ground contact sleeve may include inward protrusions of various configurations explained further below that provide increased contact surface area with the sensor housing (105 in FIG. 4), while providing space for the ejection of debris upon insertion of a sensor (102 in FIG. 4) into the ground contact sleeve.

A ground contact sleeve left in place in the ground to provide an identical sensor position for 4D seismic imaging may accumulate sediment or debris in the interior over time, even when a using a cap. By using inward protrusions, such embodiments may enable a sensor to be inserted into the ground contact sleeve even when the interior of the ground contact sleeve is partially or completely filled with liquid and debris.

In another embodiment, features such as splines on an interior wall or the top surface of the ground contact sleeve 100 may be in the form of longitudinal lines separated by at least 2 mm and up to 10 mm. The longitudinal lines should provide acoustic coupling to the sensor and allow for ejection of debris or sediment when the sensor is inserted into the ground contact sleeve. The height of the splines may be selected to provide an interference fit between the splines and the sensor housing (105 in FIG. 4) for good acoustic coupling.

If the ground contact sleeve 100 has auger flights (or threads) on its exterior, the foregoing will grip the surface soil, pulling the ground contact sleeve 100 into the soil material as it is rotated. The ground contact sleeve 100 and the auger flights will displace the soil outwardly and away from the sleeve, compacting the displaced soil material into the soil surrounding the contact sleeve. As the contact sleeve is pulled into the earth the flights push the earth material, thus compacting the material vertically and finishing with an amount of stress remaining between the flights and the material above it ensuring good acoustic coupling between the ground and the ground contact sleeve 100. The auger shape may have a taper angle (T in FIG. 9) of 50 degrees. In an example embodiment, the thread pitch (P in FIG. 9) is 1.4" with a thread depth of 0.75".

The body of the ground contact sleeve 100 may be shaped to include any known configuration of auger flights, including, but not limited to, a conical shape of the ground contact sleeve with ridges and "multi start" flights. The range of multi start flights may be 4 to 20 threads per inch, and the preferred range may be 8 to 16 threads per inch. The multi start threads may have a lower limit of 2 but may be up to 8, with a preferred range of 2 to 4.

The action of the ground contact sleeve being inserted into the earth, whether punched, pressed or screwed, causes the material around the ground contact sleeve to be pushed outwards and compacts the material and creates and zone of continuous density change from the densest at the exterior surface of the sleeve to existing ground material density away from the sleeve. This varying density around the sleeve creates an earth/sleeve coupling component that is essentially unity. Thus the ground contact sleeve 100 can be substantially acoustically transparent thus reducing or removing any abrupt acoustic path changes around the ground contact sleeve 100.

Detection and navigation to a pre-placed ground contact sleeve may be enhanced using one or more devices such as magnets, or fluorescent or phosphorescent dyes. One or more permanent magnets with a strength of 100 to 5000 Gauss may be used and in some embodiments a preferred range of 1000 to 3000 Gauss may be used for such magnet(s). Such magnet(s) permit ease of detection by a metal detector or magnetometer, for example. For embodiments having some protrusion of the upper surface of the ground contact sleeve from the soil, the ground contact sleeve may be made from plastic having fluorescent or phosphorescent dye mixed therein. Fluorescent dyes may be activated by a wavelength light of 400 to 700 nm (nanometers), which excludes the dye from fluorescing under the light of ordinary flashlights. Phosphorescent pigments sensitive to visible light may also be used, and may be preferred where keeping the sensor or contact sleeve hidden is not required. In some cases, obscuring the node or the ground contact sleeve from easy detection may be desired to reduce the possibility of theft of the sensor node.

The ground contact sleeve material, as explained above may be any suitable material including, but not limited to, molded rigid hard plastics with a durometer of 50 to 120 and characterized as thermoplastic or thermoset materials. Such material should have a specific gravity of 0.75 to 1.4 and a low coefficient of friction, for example in a range of 0.01 to 0.5, and more preferably in a range of 0.1 to 0.3. Sand cast metals, for example, aluminum, and machined metals and plastics may also be used. Example plastics suitable for use in some embodiments may be ultra-high molecular weight Polyethylene, high density polyethylene or acrylonitrile butadiene styrene (ABS), nylon rayon, dalrin, acetal, thermoplastic polyurethane, polycarbonate, polyester, polyether, acrylic, or similar polymers known to those skilled in the art.

In another embodiment, the ground contact sleeve may be affixed to the earth with a polymer system that cures into an acoustic transmitting foam. Such a foam chemically bonds to the ground contact sleeve while also binding loose sediment or soil components. Examples of the foregoing may include polyurethane, cross-linked poly saccharide, silicon based polymer, or acrylic polymer.

The sensor housing may be produced as, but not limited to, one all-inclusive part, or of two parts with the second part being an outer sleeve body that is hollow internally to firmly accept the insertion of the sensor node body after the first part is installed into the ground contact sleeve.

The sensor unit installation process may be performed in a number of ways, including, without limitation, manually with a type of slide hammer device to punch a pilot or starting hole or with an auger style unit (diameter smaller than the ground contact sleeve body) and a manually operated rotating drive mechanism, such as a "T" handle, or a battery or gasoline powered drill unit; partially automated with a hydraulically powered punching machine to produce a vertically controlled starter hole, or to punch and insert a sleeve; and fully automated with the hole punch and then an automated machine that carries the sensor node units, that punches, and installs, the ground contact sleeve into the ground and then inserts the sensor node unit, or to punch a starter hole into the ground and then screw an auger style ground contact sleeve unit into the pre-punched hole. This machine may also include electronics to log the geodetic location and test and evaluate the deployed nodal sensor unit and its associated electronics.

Figure 5:
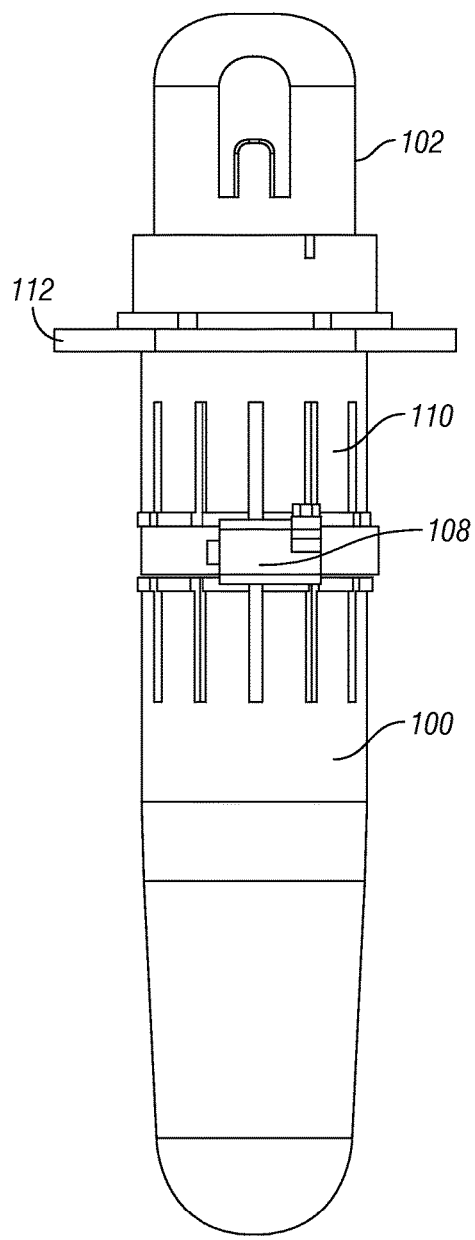
FIGS. 5-7 show an example locking mechanism to secure a sensor in a ground contact sleeve.
Figure 6:
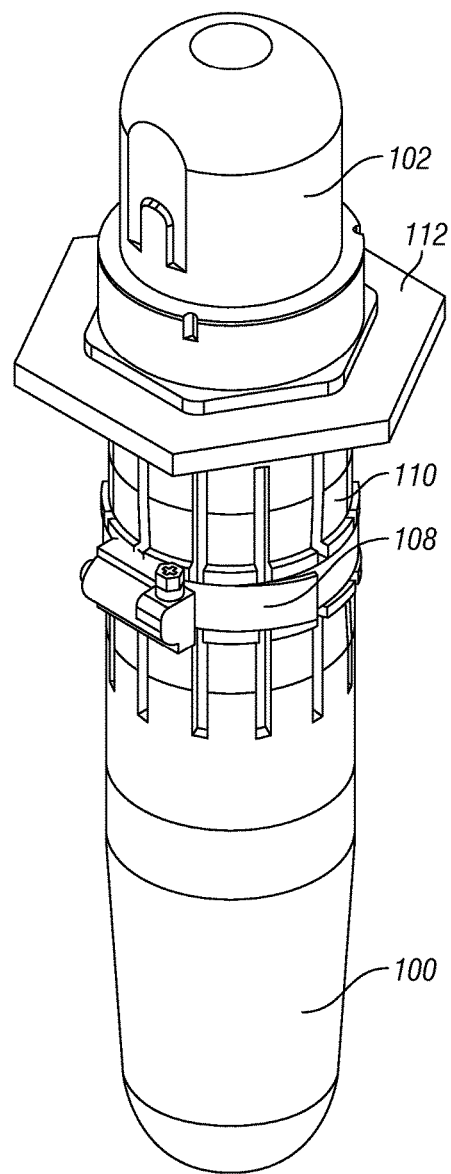
Figure 7:
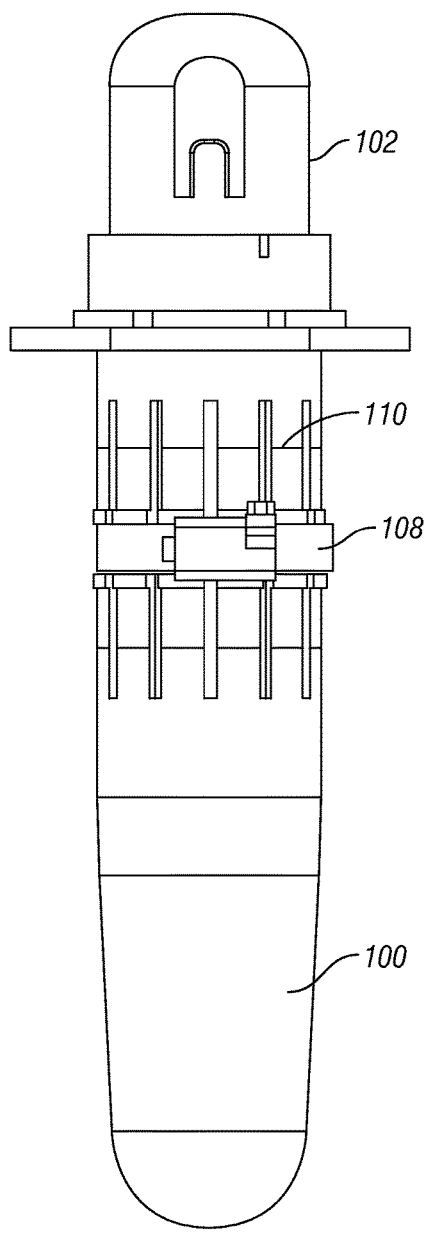

FIGS. 5-7 show an example locking mechanism to secure a sensor or nodal recorder in a ground contact sleeve. The ground contact sleeve 100 may have features as explained above and as will be further explained below to facilitate installing the ground contact sleeve 100 into the surface soil by pressing, rotating or by impact. A sensor 102, for example, a nodal recorder seismic sensor, may be disposed inside the ground contact sleeve 100. The ground contact sleeve 100 may include compressible ribs 110 circumferentially disposed around the wall of the ground contact sleeve 100 to enable compression of the ribs 110 against the exterior of the sensor 102. A clamp 108, such as a threaded clamp, may be tightened to compress the ribs 110 and lock the sensor 102 in the ground contact sleeve 100. The clamp 108 may be configured to be operable only by a specific tool to reduce the possibility of unauthorized loosening of the clamp 108 and subsequent unauthorized removal of the sensor 102 from the ground contact sleeve 100. The example embodiment shown may include a tool surface 112 for applying pressure or impact to the ground contact sleeve 100 for insertion into the ground or soil surface. In some embodiments, a pre-formed hole of somewhat smaller internal diameter than the outer diameter of the ground contact sleeve 100 may be used for emplacement of the sleeve 100. The tool surface 112 may enable insertion of the ground contact sleeve 100 into the ground surface with the sensor 102 already emplaced in the sleeve 100. An oblique view of the embodiment shown in FIG. 5 may be observed in FIG. 6.

FIG. 7 shows the embodiment of FIG. 5 wherein the clamp 108 is tightened to compress the ribs 110, thereby locking the sensor 102 into place in the ground contact sleeve 100.

Figure 8:
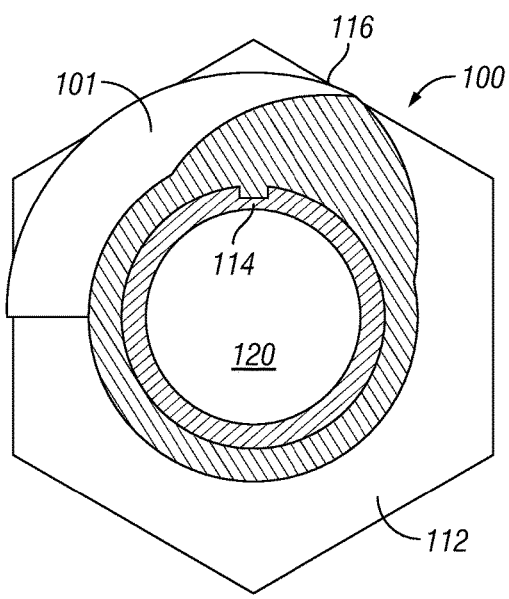
FIGS. 8 and 9 show a cross section and side view of an example embodiment including a sensor and ground sleeve indexing device.

FIGS. 8 and 9 show a cross section and side view of an example embodiment including a sensor and ground contact sleeve indexing device. Referring first to FIG. 8, an index tab 114 may be provided on the interior surface of the ground contact sleeve 100 so that when the sensor (102 in FIG. 4) is inserted into the interior 120 of the ground contact sleeve 100, the sensor (102 in FIG. 4) will be oriented in the same direction each time. An external indexing feature 116 may be provided to enable the user to determine the geodetic orientation of the ground contact sleeve 100. The present example ground contact sleeve 100 may use auger flights 100 to provide that the ground contact sleeve 100 may be inserted into the surface soil by rotation. A tool surface 112 may be provided to facilitate rotation of the ground contact sleeve 100 for insertion by use of a mating tool (not shown). The present example embodiment has a hexagonally shaped tool surface 112, however the shape in any other embodiment may be different. Other known shapes that may be used in other embodiments include, without limitation, squares, triangles and 12-point contact bolt head shapes.

A side view of the embodiment of FIG. 8 is shown in FIG. 9, wherein the auger flights 101 are clearly visible. The embodiment shown in FIG. 9 has a sensor 102 already emplaced in the sleeve 100 for insertion together into the surface soil.

Other aspects of the ground contact sleeve 100 that may be used in some embodiments are shown in FIG. 9 as a taper angle T subtended by the auger flights 101. A range of the taper angle T may be in a range of 20 to 80 degrees. In some embodiments, the taper angle T may be 50 degrees. A pitch P of the auger flights may be in a range of 4 to 20 threads per inch. In some embodiments, the pitch P may be 8 to 16 threads per inch. In some embodiments, a thread depth may be 0.75 inches.

Figure 10:
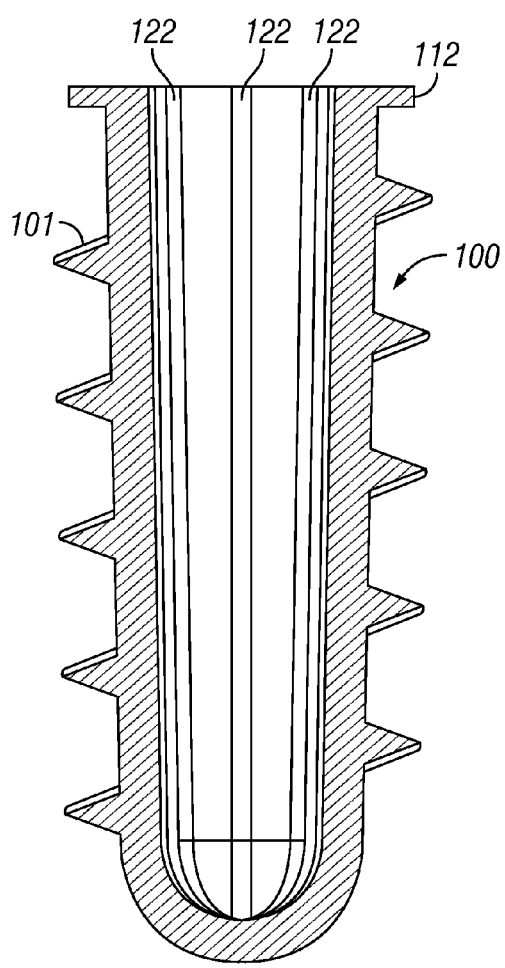
FIG. 10 shows an example ground contact sleeve with internal protrusions to improve coupling between the sleeve and a sensor while enabling replacement of the sensor at a later time.

FIG. 10 shows an example ground contact sleeve 100 with internal protrusions 122 extending inwardly from an interior wall surface of the ground contact sleeve 100 to improve coupling between the ground contact sleeve 100 and a sensor (e.g., 102 in FIG. 4) while enabling removal and/or replacement of the sensor at a later time. In the embodiment shown in FIG. 10, the protrusions 122 may be substantially linear, and may define an internal diameter slightly less than the external diameter of a corresponding portion of the sensor (102 in FIG. 4) such that the sensor forms an interference fit with the protrusions 122. The height of the protrusions 122 may be selected to enable ready displacement of dirt, debris and liquid from the interior of the ground contact sleeve 100 when the sensor (102 in FIG. 4) is inserted therein. The example shown in FIG. 10 may have auger flights 101 for contacting the soil, however, the external configuration of the embodiment shown in FIG. 10 is not so limited.

FIG. 11 shows a top view of the example embodiment shown in FIG. 10, where the protrusions 122 and tool surface 112 are clearly observable.

FIG. 12 shows an oblique cut away view of the embodiment shown in FIG. 10.

FIG. 13 shows an oblique view of the embodiment shown in FIG. 10. The protrusions, which may be referred to as "splines" on the interior wall or the top surface of the ground contact sleeve 100 may be longitudinal ribs. In some embodiments, there may be at least 3 and as many as 20 such ribs 122, with a preferred range of 6-12 ribs 122. The rib thickness may be about 0.02 inches to 0.25 inches with a preferred thickness range between about 0.06 and 0.2 inches. The available surface are for coupling to the sensor may be about 350 mm$^2$ to 27850 mm$^2$ with a preferred range of 2105 mm$^2$ to 13,760 mm$^2$.

Figure 14:
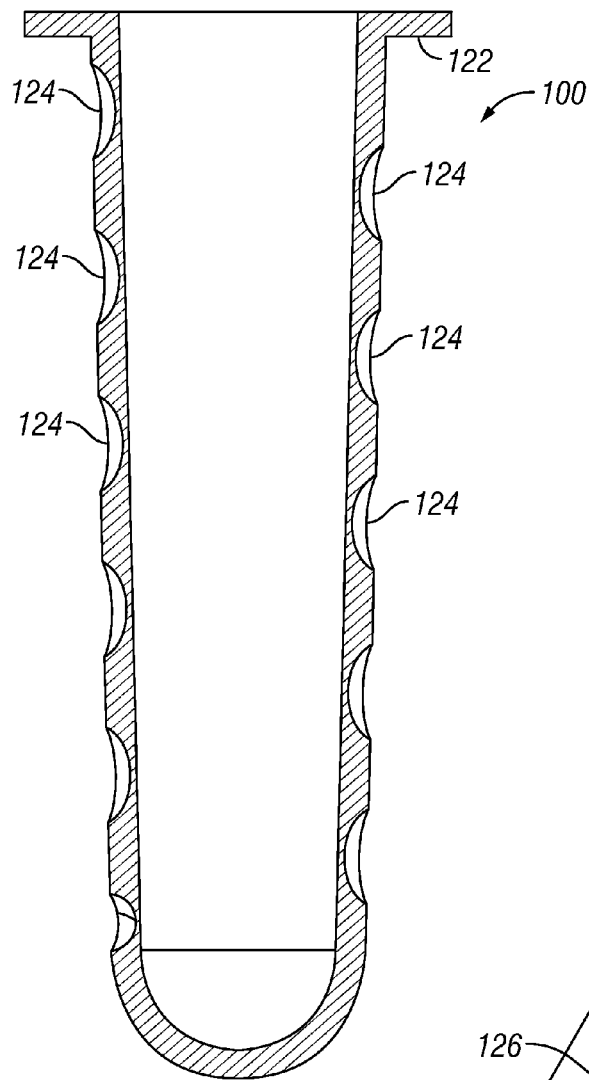
FIG. 14 shows another example embodiment that may be pressed into or impact driven into a pre-formed hole in the surface soil.

FIG. 14 shows another example embodiment of a ground contact sleeve 100 that may be pressed into or impact driven into a pre-formed hole in the surface soil. The ground contact sleeve 100 may include a tool surface 112 for pressing or impact driving the ground contact sleeve 100 into the soil. The exterior surface of the ground contact sleeve 100 may include a plurality of indentations to increase the surface area of the ground contact sleeve 100 in contact with the soil and to increase the resistance of the ground contact sleeve 100 to removal from the soil as the soil becomes compacted over time.

Figure 15:
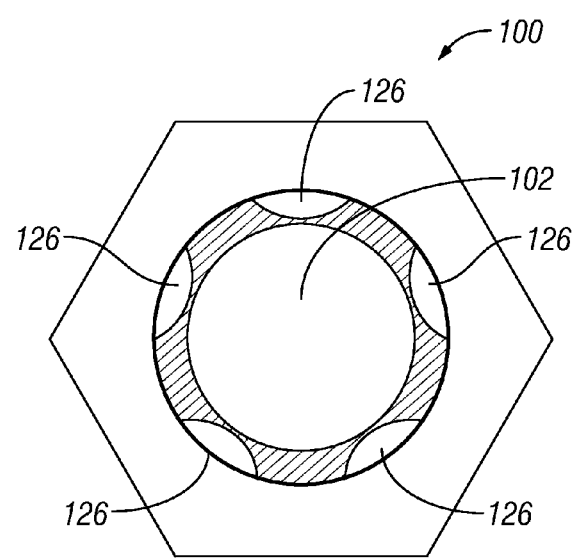
FIG. 15 shows another embodiment of internal protrusions for increasing acoustic coupling between a sensor and the ground contact sleeve.

FIG. 15 shows another embodiment of a ground contact sleeve having internal protrusions 126 for increasing acoustic coupling between a sensor and the ground contact sleeve 100. In the present embodiment, the internal protrusions 126 may be in the form of "buttons" or similarly shaped elements. The present embodiment provides for increased surface area contact between the ground contact sleeve 100 and the sensor node, while providing sufficient space for the ejection of debris upon insertion of a sensor node into the ground contact sleeve. Ground contact sleeves may be allowed to remain in the ground to facilitate sensor placement at identical geodetic locations for 4D (time lapse 3D) imaging. When left in the ground, the ground contact sleeves may accumulate sediment or debris inside over time, even with the use of a cap. The arrangement of indentations or internally directed protrusions as in the above described embodiments may increase the surface area from a range of 100 mm$^2$ to 1000 mm$^2$, with a preferred range from 500 mm$^2$ to 750 mm$^2$ while providing free space for ready ejection of such debris when a sensor is inserted into the ground contact sleeve.

Figure 16:
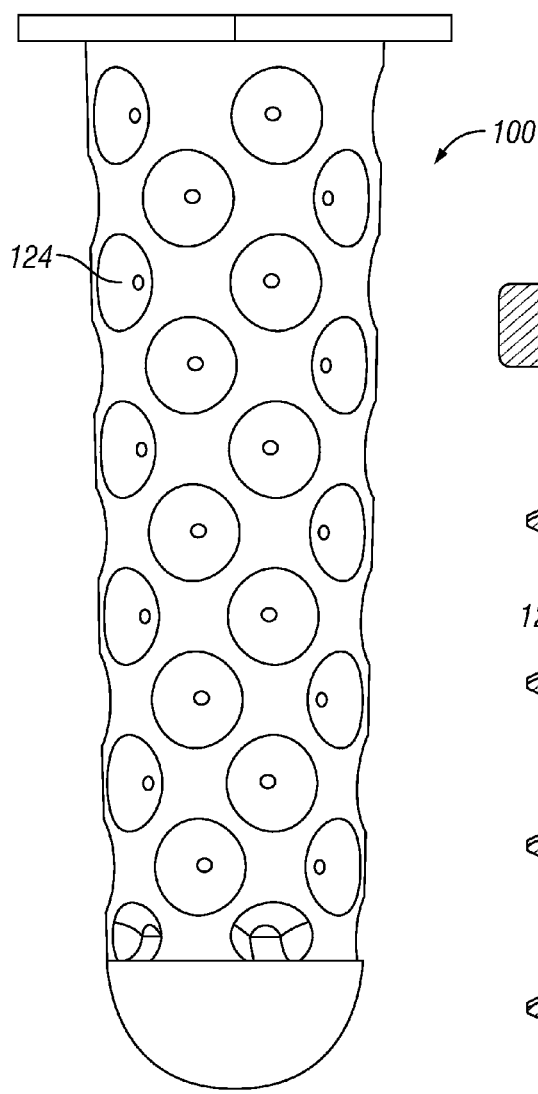
FIG. 16 shows another embodiment similar to that of FIG. 14.

FIG. 16 shows another embodiment similar to that of FIG. 14 having indentations 124 on the exterior surface to increase the contact surface area between the soil and the exterior of the ground contact sleeve 100.

Figure 17:
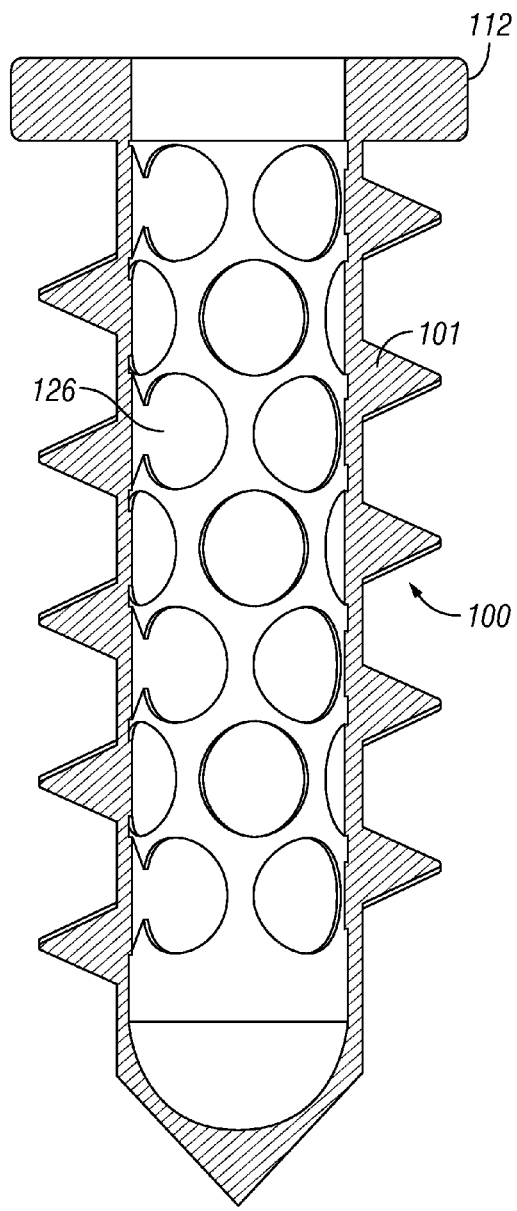
FIG. 17 shows an example embodiment combining features such as shown in FIG. 15 with an auger shaped external surface on the ground contact sleeve.

FIG. 17 shows an example embodiment combining internal protrusion features 126 such as shown in FIG. 15 with an auger shaped external surface, shown as flights 101 on the exterior of the ground contact sleeve 100. As in other embodiments, a tool surface 112 may be provided for pressing, impacting or rotating the ground contact sleeve 100 to install it in the ground or soil surface.

Figure 18:
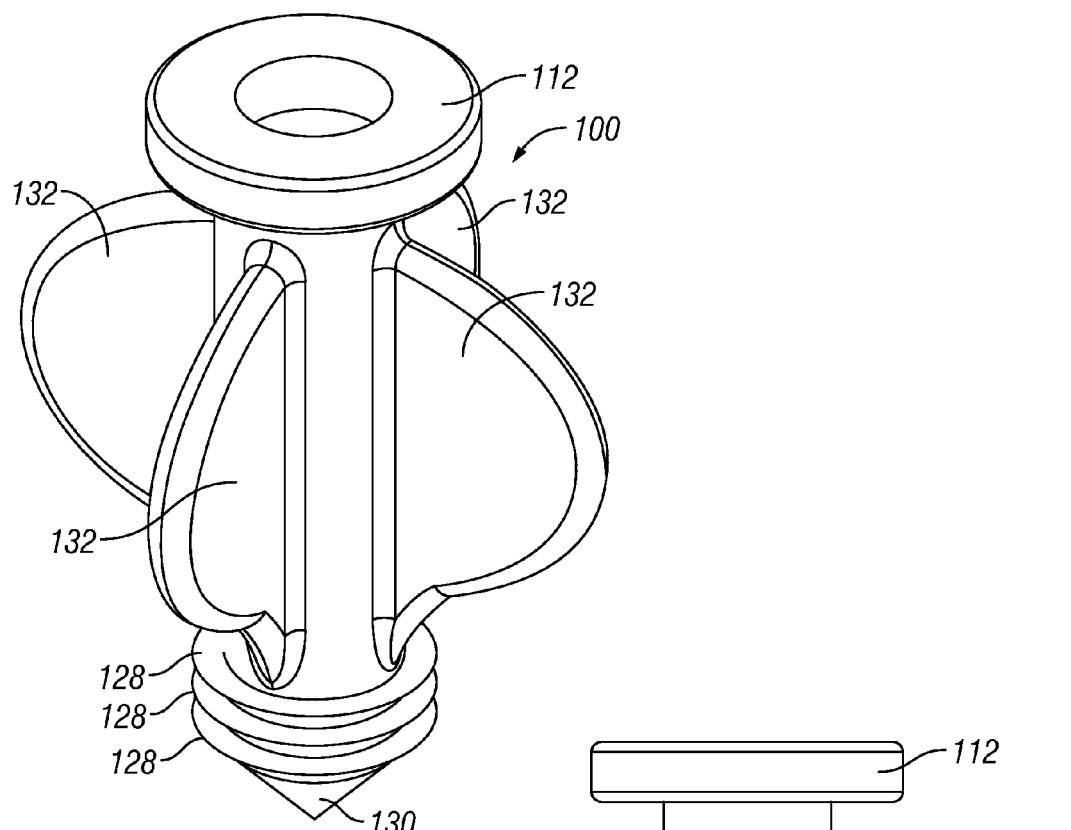
FIGS. 18 and 19 show, respectively, side and oblique views of an embodiment that may be used with multi-component seismic sensors.
Figure 19:
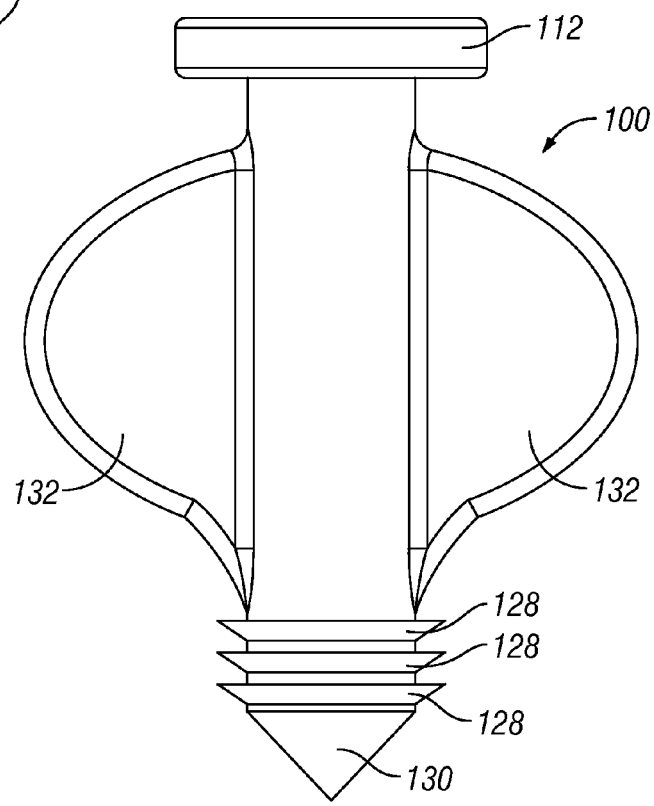

FIGS. 18 and 19 show, respectively, side and oblique views of an embodiment that may be used with multi-component seismic sensors. The embodiments shown in FIGS. 18 and 19 may include a generally ballistic shaped or pointed lower end 130 to facilitate installation of the ground contact sleeve 100 by impact or pressing on a tool surface 112. The exterior circumference of the ground contact sleeve 100 may include circumferentially spaced apart blades 132. The present example embodiment has four, equiangularly spaced apart blades arranged substantially along a longitudinal axis of the ground contact sleeve 100, however the number of blades 132 and angular spacing between adjacent blades may be different in other embodiments. The ground contact sleeve 100 may include, proximate the lower end 130 one or more contact ribs 128 in substantially ring shape covering the circumference of the sleeve. In the present embodiment, the contact ribs 128 may be substantially perpendicular to the longitudinal axis of the ground contact sleeve 100 to enhance coupling of vertical motion of the ground to the ground contact sleeve 100. The blades 132 may enhance coupling of horizontal motion of the ground along any direction to the ground contact sleeve. Thus, the embodiment shown in FIGS. 18 and 19 may provide enhanced ground contact characteristics for detecting ground motion other than vertically, as well as detecting different modes of ground motion, e.g., compressional motion and shear motion.

As explained above, some embodiments of the ground contact sleeve may be configured to be able to be "punched" or pressed into the soil by use of, e.g., a hydraulically driven, pointed punch or press device, where a ground contact sleeve is placed onto the punch end so when the ground contact sleeve is driven into the ground and the punch device is retracted, the sleeve remains in the ground. In some embodiments a pilot hole may be punched, drilled or pressed in the earth prior to insertion of the ground contact sleeve.

The increased surface area provided by external feature such as explained above may improve the mechanical strength provided by insertion of the ground contact sleeve into the pilot hole with diameter less than the diameter of the ground contact sleeve. For such an application, an example range of pilot hole diameter is 1.75 inches to 2.75 inches, with a preferred range of 1.9 inches to 2.4 inches.

As explained above, the ground contact sleeve may be made from any suitable solid material that is a good conductor of acoustic energy. Preferably a density difference between the ground materials and the material from which the sleeve is made is minimized to reduce acoustic impedance contrast between the ground contact sleeve and the surrounding ground materials (see FIG. 4). The material selected may also be strong enough to withstand multiple insertions and retrievals of the sensor with respect to the ground contact sleeve. Those skilled in the art will appreciate that the selected material may have acoustic properties best suited for acoustic coupling with the determined local soil composition. In other embodiments, a soil binding material may be included during installation of the ground contact sleeve into the surface soil. Such soil binding compositions may include naturally occurring biopolymers such as guar gum and minerals containing borate such as ulexite.

If the ground contact sleeve is auger shaped on its exterior surface, flights (or threads) will grip the earth pulling the ground contact sleeve 100 into the earth material as it is rotated. The flights will displace the soil material outwards and away from the sleeve, compacting the displaced earth material into the earth material surrounding the sleeve. As the ground contact sleeve is pulled into the earth the flights push up on the earth material compacting the material vertically and finishing with an amount of stress remaining between the flights and the material above it ensuring good acoustic coupling between the ground and the ground contact sleeve. An example auger shape may have a thread taper angle in a range of 20 to 80 degrees with a preferred angle of 50 degrees. In one example embodiment, the thread pitch is 1.4 inches with a depth of 0.75 inches.

The body of the ground contact sleeve may be shaped to include any known configuration of auger flights, including, but not limited to, a conical shape of the body with ridges and "multi-start" flights. The range of multi-start thread would be 4 to 20 threads per inch, and the preferred range would be 8 to 16 threads per inch. Multi-start threads may have a lower limit of 2 but may be up to 8, with a preferred range of 2 to 4.

Detection and navigation to a placed ground contact sleeve may be enhanced using, for example, magnets or fluorescent or phosphorescent dyes. Suitable phosphors include zinc sulfide with copper. Suitable fluorophosphors include fluorescein and Nile blue, which can be activated by flashlights filtered with the correct excitation wavelength. Magnets with a strength of 100 to 5000 Gauss may be used, with a preferred range of 1000 to 3000 Gauss. Such magnets permit ease of detection by a metal detector or magnetometer, for example. For protrusion of the upper portion of the ground contact sleeve from the earth, a cap may be made molded with fluorescent or phosphorescent dye. Fluorescent dyes may be activated by a wavelength light of 400 to 700 nm, which hides the dye from detection by the light emitted by ordinary visible light flashlights. Phosphorescent pigments may also be used, and may be preferred when keeping the ground contact sleeve hidden from detection is not required. In some cases, obscuring the sensor and ground contact sleeve from ease of detection is desirable to reduce the risk of theft of the sensor. In some embodiments, and again referring to FIG. 9, an installed ground contact sleeve may be located by using a RFID interrogation device to activate an embedded RFID transponder 111 formed into or applied to the ground contact sleeve 100. The RFID transponder 111 may include data concerning the geodetic location and orientation of the particular ground contact sleeve 100 so that in a time lapse seismic survey the data recorded by the sensor disposed in any particular sleeve 100 may be correlated to the geodetic information coded in the particular RFID transponder 111.

The ground contact sleeve material, as explained above may be of any suitable material including, but not limited to, molded rigid hard plastics with a durometer of 50 to 120 and characterized as thermoplastic or thermoset materials. Such material should have a specific gravity of about 0.75 to 1.4 and a low coefficient of friction, in a range of 0.01 to 0.5, and more preferably in a range of 0.1 to 0.3.

In another embodiment, the ground contact sleeve may be affixed to the earth with a polymeric system that cures into an acoustic transmitting foam. Such a foam chemically bonds to the ground contact sleeve while also binding loose sediment. Examples include polyurethane, cross-linked polysaccharide, silicon based polymer, or acrylic polymer. In a preferred embodiment and polysaccharides is gelled with a mineral such as ulexite to bind to surrounding soil.

The sensor (e.g., 102 in FIG. 4) may be produced as, but not limited to, one all-inclusive part, or of two parts with the second part being an outer sleeve body that is hollow internally to firmly accept the insertion of the sensor node body after the first part is installed into the ground.

The sensor node installation process may be performed in a number of ways, including, without limitation, manually with a type of slide hammer to punch a pilot or starting hole or with an auger style sleeve (hole diameter smaller than the ground contact sleeve diameter) and a manually operated rotating drive mechanism, such as a "T" handle, or a battery or gasoline powered drill unit; partially automated with a hydraulically powered punching machine to produce a vertically controlled starter hole, or to punch and insert a sleeve; and fully automated with the hole punch and then an automated machine that carries the sensor node units, that punches, and installs, the ground contact sleeve into the ground and then inserts the sensor node unit, or to punch a starter hole into the ground and then screw an auger style ground contact sleeve unit into the pre-punched hole. This machine may also include electronics to log the geodetic location and test and evaluate the deployed nodal sensor unit and its associated electronics.

Should it prove necessary or desirable to remove the sensor node 102, such may be performed, in the case of threading coupling to the ground contact sleeve 100, by merely unthreading the sensor node 102 from the ground contact sleeve 100. For interference fit sensors, it is only necessary to pull the sensor out of the ground contact sleeve. A replacement sensor node 102 may be installed into the existing ground contact sleeve, or the same sensor node 102 may be replaced after servicing and/or interrogation of stored data.

An example sensor node that may be used with the present example ground contact sleeve may be one sold under the trademark NUSEIS, which is a trademark of Geophysical Technology, Inc., Bellaire, Tex. 77401.

A possible advantage of a separate ground contact sleeve and sensor node according to various aspects of the present disclosure may be that the sensor node may be removed from ground contact and serviced or replaced while maintaining quality of acoustic coupling between the sensor(s) in the sensor node after reinstallation. Further, removal of a sensor node for servicing or replacement will not result in any change in geodetic position of the sensor(s) thereafter.

In a method of using a geophysical sensor system according to the present disclosure, ground contact sleeves according to any of the foregoing embodiments may be disposed in a selected geometric pattern. A sensor or sensor recording node may be inserted into each of the ground contact sleeves, substantially as explained with reference to FIG. 4. Geophysical signals, e.g., seismic signals may be detected for a selected period of time. If nodal recorders are used for the sensors, the detected signals may be recorded in each nodal recorder. After detecting the signals for a selected period of time, the sensors or nodal recorders may be removed, and the ground contact sleeves left in place. At a later time, one or more sensors or nodal recorders may be placed in any one or all of the emplaced ground contact sleeves and signal detection and/or recording may be repeated. In such manner, a 4-dimensional (4D) or time lapse seismic survey may be recorded.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A nodal geophysical sensing system, comprising:
   a ground contact sleeve defining an interior space and having at least one feature on an exterior thereof for contacting and compressing ground materials adjacent the exterior, the at least one feature increasing a surface area of the exterior surface beyond that of a substantially smooth, round surface;
   a nodal geophysical sensor enclosed in a separate housing, the separate housing engaging at least one feature on the interior space so as to enable acoustic energy transmission between the ground contact sleeve and the housing; and
   wherein the ground contact sleeve comprises a locking mechanism to secure the separate housing within the ground contact sleeve.

2. The system of claim 1 wherein the at least one feature on the exterior of the ground contact sleeve compresses the ground materials both along an axis of the ground contact sleeve and perpendicularly thereto.

3. The system of claim 2 wherein the at least one feature on the ground contact sleeve comprises auger threads with a taper angle of 20 to 80 degrees.

4. The system of claim 2 wherein the at least one feature on the ground contact sleeve comprises auger threads having a thread pitch of 4 to 20 threads per inch.

5. The system of claim 1 wherein the at least one feature on the exterior surface of the ground sleeve comprises a conical shape.

6. The system of claim 1 wherein the at least one feature in the interior space comprises splines.

7. The system of claim 6 wherein the splines define an internal diameter smaller than an external diameter of the housing of the geophysical sensor.

8. The system of claim 1 wherein the separate housing comprises a shape corresponding to a shape of the interior space in the ground contact sleeve.

9. The system of claim 1 wherein the ground contact sleeve is made from a material selected to minimize acoustic impedance difference between ground materials and the ground contact sleeve.

10. The system of claim 9 wherein the material comprises at least one of molded rigid hard plastic, pressure cast plastic, sand cast metal, machined metal and machined plastic.

11. The system of claim 9 wherein the molded plastic, the pressure cast plastic or the machine plastic comprises at least one of ultra-high molecular weight polyethylene, high density polyethylene, acrylonitrile butadiene styrene and Nylon 6.

12. The system of claim 9 wherein the material comprises at least one of a phosphorescent material and a fluorescent material.

13. The system of claim 1 wherein the at least one feature on the interior space comprises an indexing feature such that the sensor housing is insertable into the ground contact sleeve only in one geodetic orientation.

14. The system of claim 1 wherein the ground contact sleeve comprises a radio frequency identification transponder having encoded therein information related to a geodetic location of the ground contact sleeve.

15. The system of claim 1 wherein the at least one feature on the interior space comprises inwardly extending protrusions having shape and dimensions selected to form an interference fit with the sensor and to provide space for ejection of debris and fluid resulting from the volume displaced by the sensor.

16. The system of claim 1 wherein the at least one feature on the exterior surface comprises a plurality of blades extending substantially radially outwardly from and parallel to a longitudinal axis of the ground contact sleeve.

17. The system of claim 16 further comprising at least one rib substantially perpendicular to the longitudinal axis of the ground contact sleeve.

18. The system of claim 1 wherein the locking mechanism comprises compressible ribs circumferentially disposed around a wall of the ground contact sleeve and a clamp arranged to compress the compressible ribs.

19. The system of claim 1 wherein the ground contact sleeve comprises a cap removably affixed to the ground contact sleeve.

20. A method for geophysical surveying, comprising:
    inserting at least one geophysical ground contact sleeve into a ground surface;
    inserting a geophysical sensor disposed in a separate housing into the ground contact sleeve;
actuating a locking mechanism to secure the separate housing in the ground contact sleeve:
    detecting geophysical signals for a selected length of time;
removing the geophysical sensor in the separate housing from the ground contact sleeve; and
    after a selected period of time, repeating the inserting the sensor into the ground contact sleeve and detecting geophysical signals.

\* \* \* \* \*